United States Patent [19]

Yamada et al.

[11] Patent Number: 5,250,959
[45] Date of Patent: Oct. 5, 1993

[54] ELECTROPHOTOGRAPHIC IMAGE FORMING APPARATUS AND METHOD

[75] Inventors: Takanobu Yamada, Toyokawa; Kazuyuki Fukui, Toyohashi, both of Japan

[73] Assignee: Minolta Camera Kabushiki Kaisha, Osaka, Japan

[21] Appl. No.: 698,103

[22] Filed: May 10, 1991

[30] Foreign Application Priority Data

May 15, 1990 [JP] Japan ................................. 2-125823

[51] Int. Cl.[5] .............................................. H04N 1/21
[52] U.S. Cl. ..................................... 346/108; 358/298
[58] Field of Search ................... 346/1.1, 108, 107 R, 346/160; 355/246; 358/298

[56] References Cited

U.S. PATENT DOCUMENTS

| | | |
|---|---|---|
| 4,277,162 | 7/1981 | Kasahara et al. . |
| 4,801,980 | 1/1989 | Arai et al. .......................... 355/246 |
| 4,873,428 | 10/1989 | Takeuchi et al. . |
| 4,914,459 | 4/1990 | Mama et al. ........................ 346/160 |

FOREIGN PATENT DOCUMENTS 51-47435 4/1976 Japan .
1-196347 8/1989 Japan .

Primary Examiner—Mark J. Reinhart
Attorney, Agent, or Firm—Burns, Doane, Swecker & Mathis

[57] ABSTRACT

An electrophotographic image forming apparatus includes a photosensitive member, a charger for charging the photosensitive member with a given initial potential, a laser diode for forming an electrostatic latent image by applying light to the photosensitive member charged with the initial potential, a laser driver for controlling the amount of light to be applied to the photosensitive member from the laser diode in compliance with an image density signal indicative of the density of each pixel of an image to be formed, and at least one developing device accommodating a developer consisting of toner and carrier. The electrostatic latent image formed on the photosensitive member is developed by the developer contained in the developing device. The image forming apparatus further includes a toner density detector for detecting the toner density in the developer, a memory for storing a plurality of gradation correction data, and a CPU for selecting one of the plurality of gradation correction data stored in the memory based upon a toner density detected by the toner density detector. The CPU makes the laser driver control the amount of light based upon gradation correction data selected by the CPU.

17 Claims, 5 Drawing Sheets

ELECTROPHOTOGRAPHIC IMAGE FORMING APPARATUS AND METHOD

BACKGROUND OF THE INVENTION

1. Field of the Invention

The present invention relates generally to an electrophotographic image forming apparatus and method, and more particularly to an image forming apparatus and method of a type controlling an exposure output upon correction of gradations of image data.

2. Description of the Related Art

In a digital color copier, image signals from an image reader such as a CCD or the like are initially converted to digital image data of, for example, eight bits (256 gradations) by an analog-to-digital converter (A/D converter). Thereafter, in order to enhance the fidelity of half-tone images, an exposure output is controlled upon correction of gradations of the digital image data based upon a gamma-correction table formulated in accordance with non-proportional gradation characteristics called the "gamma-characteristics" between the image data to be reproduced and reproduced image density levels. The gamma-correction table is made in advance based upon a relationship between the image density and the image data and is stored in a ROM or the like.

Meanwhile, in a color copier, because color reproduction is performed based upon the subtractive color mixing of toners of cyan, magenta and yellow, any desired color reproduction needs the stability of the image density (the amount of adhesion of toner) of three different colors with respect to a photosensitive member.

To this end, an automatic toner density control (ATDC) and an automatic image density control (AIDC) are both performed in the apparatus. More specifically, in the ATDC, the toner density in a developer is detected by a toner density detector means and the amount of toner to be replenished is controlled in accordance with a detection signal thereof, thereby making the toner mixture ratio in the developer substantially constant. On the other hand, the AIDC is performed to adjust the apparatus to changes in the amount of electrostatic charge of the developer or characteristic changes of the photosensitive member caused by environmental changes. In this control, the density of a reference pattern formed on the photosensitive member is initially detected and developing conditions are changed in accordance with a detected density signal, thereby making the amount of adhesion of toner (the toner density) substantially constant. A method of changing a developing bias is widely used with highest reliability as a method of changing the developing conditions.

However, when the developing conditions are changed according to the environmental changes or the like, the gradation characteristics also change. Because of this, a single gamma-correction table cannot provide the optimum gradation correction, and therefore, the most appropriate gamma-correction table is selected from among a plurality of gamma-correction tables according to the developing conditions.

In this kind of image density control, half-tone images are faithfully reproduced with an appropriate density when the toner mixture ratio is always constant. Even though the toner mixture ratio is made constant by the ATDC, the actual toner mixture ratio always changes according to the area ratio (B/W ratio) between an image portion and a white ground of an original document or copying modes such as, for example, a continuous copying mode or an intermittent copying mode. In other words, even though the toner mixture ratio detected by an ATDC sensor is fed back to a toner replenishing means, it is impossible to immediately replenish, agitate and transport the toner. As a result, the toner mixture ratio changes.

Meanwhile, a central value in controlling the toner mixture ratio is occasionally changed. In the image density control by the AIDC, the grid voltage and the developing bias are set low when the humidity is comparatively high. As a result, the 256 gradations of the density must be controlled by a low developing voltage, and changes in surface potential or in the amount of light are followed by wide variations in the density. In contrast, the grid voltage and the developing bias are set high when the humidity is comparatively low. Since these values have respective upper limits due to the pressure resistance of the photosensitive member, saturation of the developing efficiency, or the like, the central value in controlling the toner mixture ratio is occasionally switched according to localities or seasons.

When the toner mixture ratio changes, the image density is controlled to be constant by the AIDC. However, since the gamma characteristics change as shown in FIG. 5, desired images cannot always be obtained merely by selecting a gamma-correction table from among a plurality of tables in compliance with the AIDC.

SUMMARY OF THE INVENTION

The present invention has been developed to overcome the above-described disadvantages.

It is accordingly an object of the present invention to provide an improved image forming apparatus which is capable of stably forming images, of which gradations are appropriately corrected even though the toner mixture ratio changes.

In accomplishing this and other objects, an electrophotographic image forming apparatus according to the present invention comprises a photosensitive member, a charging means for charging the photosensitive member with a given initial potential, an exposure means for forming an electrostatic latent image by applying light to the photosensitive member charged with the initial potential, an exposure control means for controlling the amount of light to be applied to the photosensitive member from the exposure means in compliance with an image density signal indicative of a density of each pixel of an image to be formed, and at least one developing device accommodating a developer consisting of toner and carrier. The electrostatic latent image formed on the photosensitive member is developed by the developer contained in the developing device.

The apparatus further comprises a toner density detector means for detecting a toner density in the developer, a memory means for storing a plurality of gradation correction data, and a selector means for selecting one of the plurality of gradation correction data stored in the memory means based upon a toner density detected by the toner density detector means.

The exposure control means controls the amount of light based upon gradation correction data selected by the selector means.

In another aspect of the present invention, an image forming method comprises the steps of:

(a) detecting a toner density in the developer;

(b) determining gradation characteristics of the image forming apparatus in compliance with the detected toner density;

(c) charging the photosensitive member with a given potential;

(d) correcting a digital signal indicative of a density of an image to be formed in compliance with the determined gradation characteristics;

(e) converting the corrected digital signal to an analog signal;

(f) forming an electrostatic latent image by applying light to the photosensitive member at an amount of light corresponding to the analog signal; and (g) developing the electrostatic latent image by the developing device.

According to the present invention, an actual toner density is detected during an image forming operation, and an image formation is performed upon selection of appropriate gradation correction data corresponding to the actual toner density. Accordingly, even if the toner density changes, desired images can be stably obtained, of which gradations are appropriately corrected.

BRIEF DESCRIPTION OF THE DRAWINGS

This and other objects and features of the present invention will become more apparent from the following description taken in conjunction with the preferred embodiments thereof with reference to the accompanying drawings, throughout which like parts are designated by like reference numerals, and wherein.

DETAILED DESCRIPTION OF THE PREFERRED EMBODIMENTS

Figure 1:
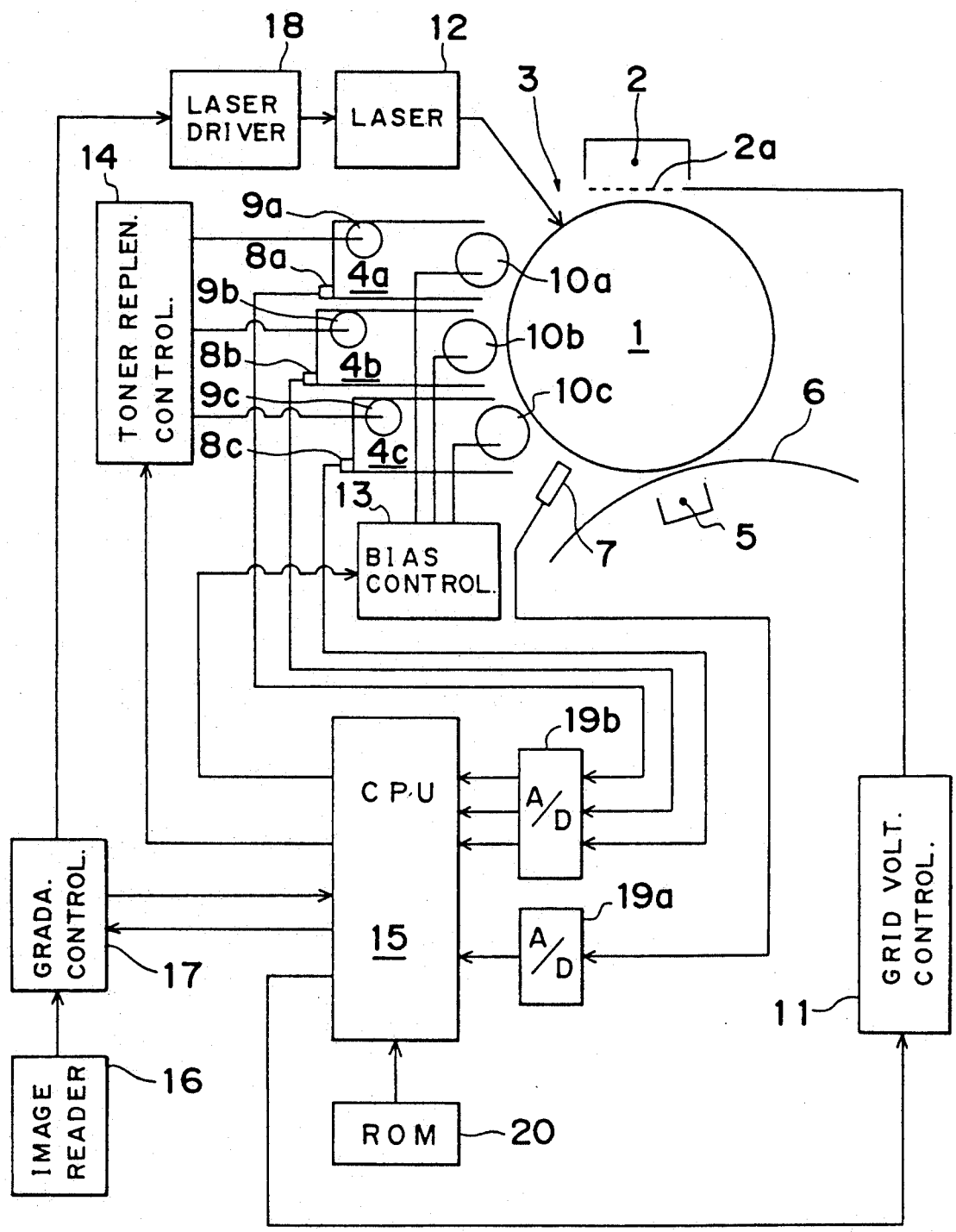
FIG. 1 is a schematic diagram of an image forming apparatus according to the present invention.

Referring now to the drawings, there is schematically shown in FIG. 1 a full-color image forming apparatus embodying the present invention. The image forming apparatus is internally provided with a photosensitive drum 1, a corona charger 2 having an arrangement called the "scorotron" for uniformly charging a photosensitive layer of the photosensitive drum 1, an exposure portion 3 for forming an electrostatic latent image upon exposure of an image formed, a plurality of developing devices 4a-4c for developing the electrostatic latent image using respective colored toners, and a transfer charger 5 for transferring a developed toner image to a transfer material 6. The corona charger 2, the exposure portion 3, the developing devices 4a-4c, and the transfer charger 5 are located around the photosensitive drum 1 in this order in the direction of rotation of the photosensitive drum 1. An AIDC sensor 7 for detecting the amount of toner adhering to the photosensitive drum 1 i.e., the amount of toner adhering to a reference pattern (this pattern is hereinafter referred to as an AIDC pattern) formed on the photosensitive drum 1 for detection of the image density is disposed downstream from the developing devices 4a-4c. The developing devices 4a-4c are provided with respective ATDC sensors 8a-8c mounted thereon for detecting the toner mixture ratio in respective developers contained therein. The developing devices 4a-4c accommodate toner replenishing means 9a-9c and developing sleeves 10a-10c, respectively.

The corona charger 2 has a grid 2a, of which the potential is controlled so as to be a predetermined potential corresponding to a surface potential of the photosensitive drum 1 by a grid voltage control circuit 11. The exposure portion 3 receives laser light from a laser diode 12. A developing bias is applied to the developing sleeves 10a-10c of the developing devices 4a-4c by a developing bias control circuit 13. The toner replenishing means 9a-9c are controlled by a toner replenishment control circuit 14 so that the toner mixture ratio in respective developers may be made constant. These grid voltage control circuit 11, developing bias control circuit 13 and toner replenishment control circuit 14 are controlled by a CPU 15. The laser diode 12 is driven by a laser driver 18 on the basis of data obtained upon correction of image data from an image reader 16 such as a CCD or the like, using a gradation control circuit 17. The gradation control circuit 17 is also controlled by the CPU 15.

Detection signals of the AIDC sensor 7 and those of the ATDC sensors 8a-8c are converted to digital signals by A/D converters 19a and 19b, respectively, and are inputted into the CPU 15. The CPU 15 is electrically coupled with a ROM 20 in which are stored various control data including a plurality of gamma-correction tables and from which such data are outputted to the CPU 15 as occasion demands.

The control of an image forming operation by the CPU 15 will be discussed hereinafter with reference to a flow-chart of FIG. 2.

Initialization is performed at step #1 followed by step #2 where various conditions for image formation such as, for example, the required number of copies are inputted. Step #3 determines whether a print switch is data from the ATDC sensors 8a-8c and those from other sensors are inputted at step #4.

At step #5, AIDC measurements are performed in which a grid voltage $V_G$ and a developing bias $V_B$ are set to respective predetermined reference values for the AIDC pattern and an output of the laser diode 12 is set to a predetermined value required for forming a halftone AIDC pattern. Upon rotation of the photosensitive drum 1, the corona charger 2 and a developing motor are activated and the developing bias $V_B$ is applied to the developing sleeves 10a-10c of the developing devices 4a-4c. The AIDC pattern is then exposed by the laser diode 12 and is developed by the developing devices 4a-4c. Finally, the image density of the AIDC pattern is detected by the AIDC sensor 7.

At step #6, based upon data outputted from the AIDC sensor 7, the most appropriate developing bias $V_B$ and grid voltage $V_G$ are selected using Table 1 below.

TABLE 1

| Level | $V_B$ | $V_G$ | Gamma-Correction Table | | | | |
|---|---|---|---|---|---|---|---|
| | | | 6% | 7% | 8% | 9% | 10% |
| 0 | −100 | −200 | $\gamma_{0,0}$ | $\gamma_{0,1}$ | $\gamma_{0,2}$ | $\gamma_{0,3}$ | $\gamma_{0,4}$ |
| 1 | −120 | −220 | $\gamma_{1,0}$ | $\gamma_{1,1}$ | $\gamma_{1,2}$ | $\gamma_{1,3}$ | $\gamma_{1,4}$ |
| 2 | −140 | −240 | $\gamma_{2,0}$ | $\gamma_{2,1}$ | $\gamma_{2,2}$ | $\gamma_{2,3}$ | $\gamma_{2,4}$ |
| ... | ... | ... | ... | ... | ... | ... | ... |
| ... | ... | ... | ... | ... | ... | ... | ... |
| ... | ... | ... | ... | ... | ... | ... | ... |
| 27 | −640 | −740 | $\gamma_{27,0}$ | $\gamma_{27,1}$ | $\gamma_{27,2}$ | $\gamma_{27,3}$ | $\gamma_{27,4}$ |
| 28 | −660 | −760 | $\gamma_{28,0}$ | $\gamma_{28,1}$ | $\gamma_{28,2}$ | $\gamma_{28,3}$ | $\gamma_{28,4}$ |

In Table 1, the data outputted from the AIDC sensor 7 are classified into density levels from 0 to 28. Set values of the developing bias $V_B$ and the grid voltage $V_G$ are determined as corresponding to respective levels. The density level detected by the AIDC sensor 7 increases with reduction of the AIDC pattern formed on the photosensitive drum 1 in density level. As a result, any image formation is performed with an optimum image density.

Figure 3:
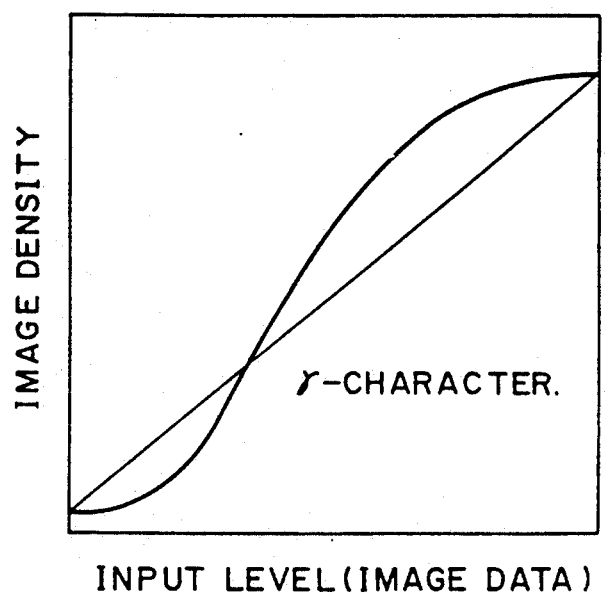
FIG. 3 is a graph of a gamma-characteristic curve indicative of a relationship between input levels of image data and the image density.
Figure 4:
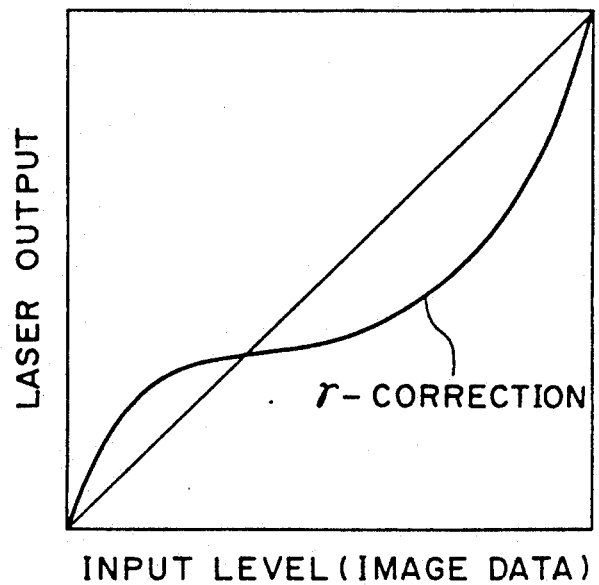
FIG. 4 is a graph of a gamma-correction characteristic curve indicative of a relationship between the input levels of image data and a laser output after gamma-correction.

The selection of gamma-correction tables is performed at step #7. Input levels of image data and the image density are in a non-proportional relationship called the "gamma-characteristics" as shown in FIG. 3. Accordingly, it is necessary to correct the output of the laser diode 12 with respect to the input levels of the image data, as shown in FIG. 4, in order to enhance the fidelity in an image formation of half-tone images. To this end, the correction-characteristics in the output of the laser diode 12 are tabulated. Since the most appropriate gamma-correction table changes according to the developing bias $V_B$ and the grid voltage $V_G$ controlled by the detection levels of the AIDC sensor 7, a large number of gamma-correction tables are formulated, as shown in Table 1, according to the detection levels of the AIDC sensor 7.

Table 2 indicates an example of gamma-correction tables $\gamma_{0,0}$ and $\gamma_{1,0}$.

TABLE 2

| Input Level | Output Level | |
|---|---|---|
| | $\gamma_{1,0}$ | $\gamma_{0,0}$ |
| 0 | 0 | 0 |
| 1 | 13 | 18 |
| 2 | 25 | 38 |
| 3 | 35 | 58 |
| 4 | 46 | 77 |
| 5 | 57 | 93 |
| 6 | 69 | 106 |
| 7 | 83 | 114 |
| 8 | 96 | 120 |
| 9 | 107 | 124 |
| 10 | 116 | 127 |
| 11 | 123 | 130 |
| 12 | 128 | 132 |
| ... | ... | ... |
| ... | ... | ... |
| 246 | 820 | 647 |
| 247 | 836 | 663 |
| 248 | 852 | 681 |
| 249 | 869 | 700 |
| 250 | 887 | 721 |
| 251 | 905 | 747 |
| 252 | 924 | 780 |
| 253 | 949 | 838 |
| 254 | 973 | 897 |
| 255 | 1023 | 1023 |

Figure 5:
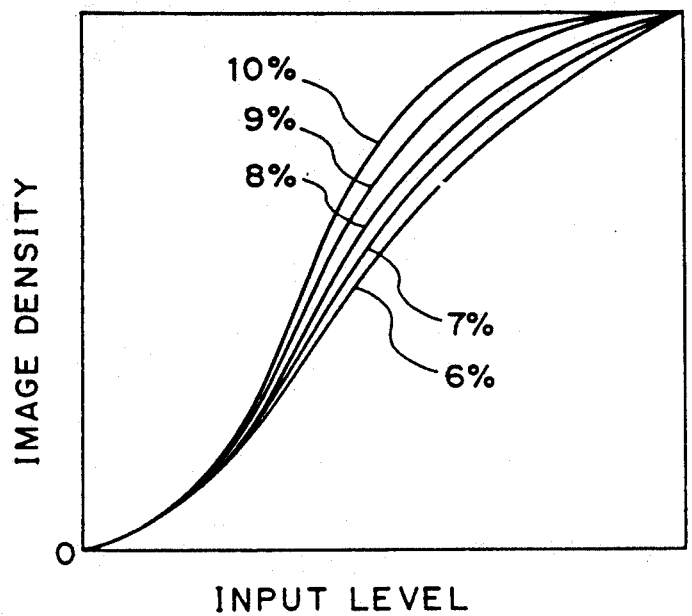
FIG. 5 is a graph of several gamma-characteristic curves with the toner mixture ratio employed as a parameter.

Furthermore, the gamma-characteristics change according to the toner density in a developer, as shown in FIG. 5, wherein the image density in a medium density portion becomes deep and that in a high density portion saturates. Accordingly, it is necessary to select one of the gamma-correction tables in compliance with the toner mixture ratio detected by the ATDC sensors 8a–8c.

In this embodiment, as shown in Table 1, a large number of gamma-correction tables are arrayed in the form of a matrix in accordance with detection levels of the AIDC sensor 7 and the toner mixture ratio and are stored in the ROM 20. From among these gamma-correction tables, the most appropriate one is selected on the basis of detection data of the AIDC sensor 7 and those of the ATDC sensors 8a–8c.

Figure 6:
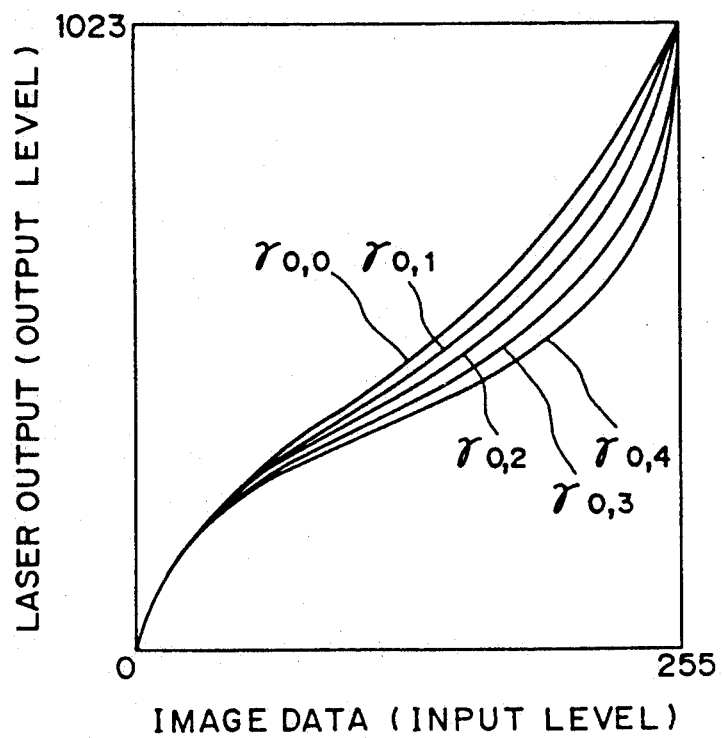
FIG. 6 is a graph of several gamma-correction characteristic curves corresponding to respective gamma-correction tables.

FIG. 6 indicates an example of the correction characteristics of gamma-correction tables $\gamma_{0,0}$, $\gamma_{0,1}$, $\gamma_{0,2}$, $\gamma_{0,3}$, $\gamma_{0,4}$, when the detection level of the AIDC sensor 7 is "0".

At step #8, an image forming operation is performed in accordance with image forming conditions set based upon detection values of the ATDC sensors 8a–8c, the CPU 15 gives the toner replenishment control circuit 14 instructions for replenishing toner by driving the toner replenishing means 9a–9c so that the toner mixture ratio in the developing devices 4a–4c may be a predetermined value.

Thereafter, step #9 determines whether the image forming operation is terminated. Unless the image forming operation is terminated, the procedure returns to step #6 to further proceed with an image forming operation in another color. In contrast, if the image forming operation is terminated at step #9, the procedure returns to step #2.

Figure 2:
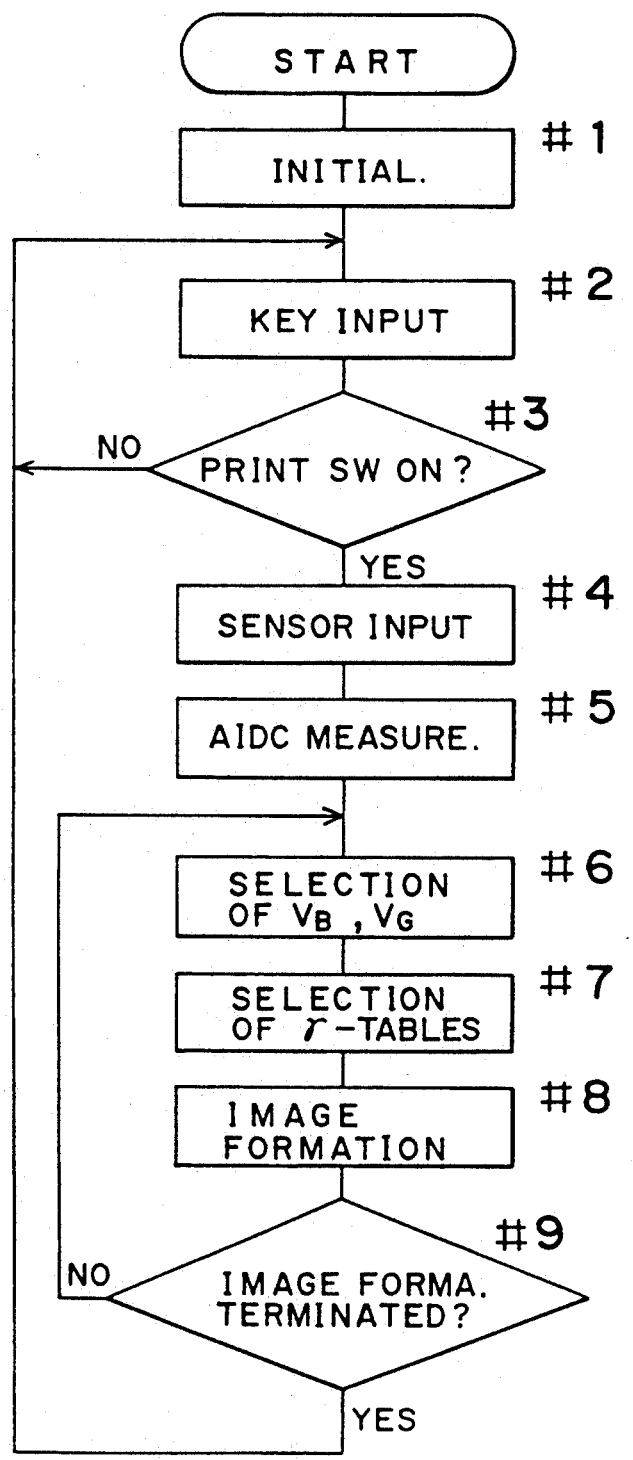
FIG. 2 is a flow-chart indicative of a control required for an image forming operation according to a first embodiment of the present invention.
Figure 7:
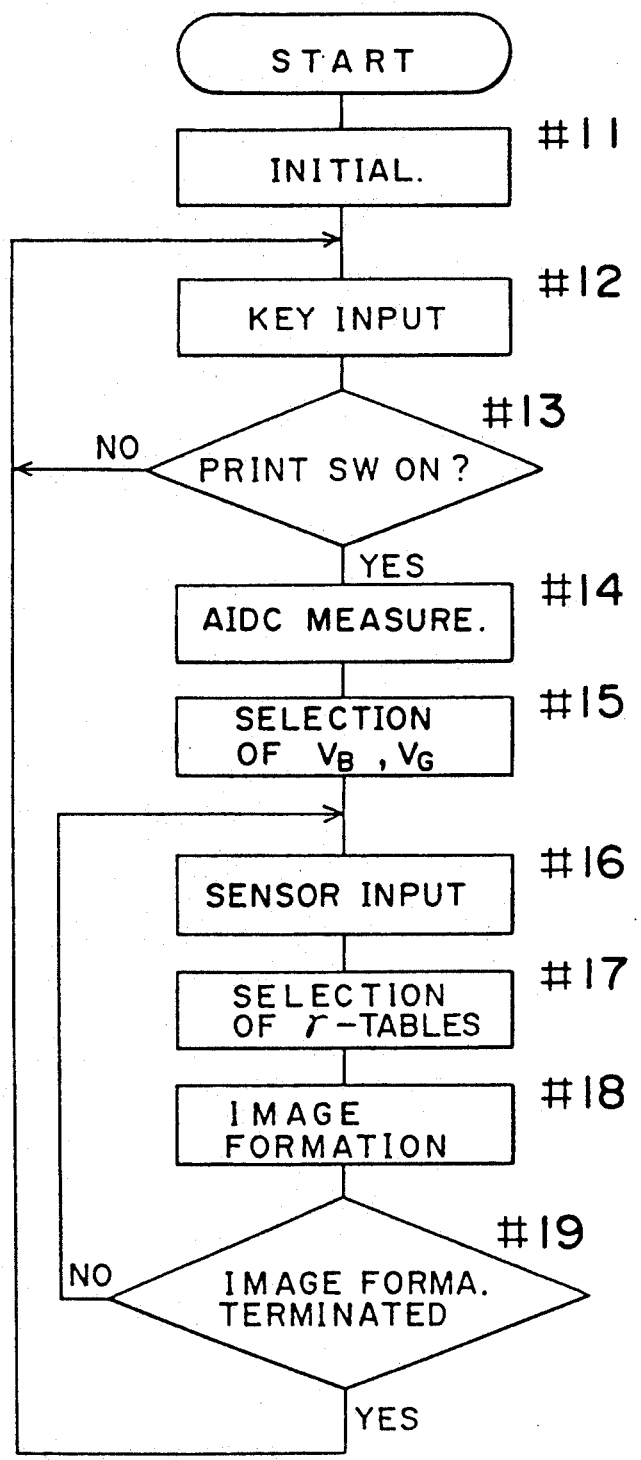
FIG. 7 is a flow-chart similar to FIG. 2, according to a second embodiment of the present invention.

It is to be noted that the flow-chart of FIG. 2 may be replaced by a flow-chart shown in FIG. 7, which indicates a second embodiment of the present invention.

Steps from #11 to #13 in the flow-chart of FIG. 7 are the same as steps from #1 to #3 in the flow-chart of FIG. 2. In the flow-chart of FIG. 7, however, if a print switch is turned on at step #13, AIDC measurements and selection of the most appropriate developing bias $V_B$ and grid voltage $V_G$ are performed at step #14 and #15, respectively, prior to input of data from the ATDC sensors 8a–8c and other sensors.

In the second embodiment shown by the flow-chart FIG. 7, detection values of the ATDC sensors 8a–8c are repeatedly inputted into the CPU 15 at step #16 until an image forming operation is terminated. At subsequent step #17, the gamma-correction tables are selected based upon such detection values. Accordingly, even if the toner density is lowered during a large number of successive image forming operations, the gamma-correction tables are appropriately changed, thereby enabling the optimum half-tone image reproduction at all times.

In the above-described embodiments, since the developing bias $V_B$ and the grid voltage $V_G$ are set on the basis of the detection signals of the AIDC sensor 7, the image formation is stably performed with an optimum image density. Furthermore, even if the toner density changes due to continuous image forming operations, the gradation characteristics can be maintained unchanged. The reason for this is that an output of the laser diode 12 is controlled in accordance with the most appropriate gamma-correction table selected from among a large number of gamma-correction tables on the basis of the detection signals of the AIDC sensor 7 and the ATDC sensors 8a–8c. As a result, half-tone images can be stably obtained.

In the above-described embodiments, the description is made with respect to an image forming apparatus of the intensity modulation type in which the laser driver 18 controls the intensity of light emitted from the laser diode 12 by changing an electric current supplied thereto on the basis of image data corrected by the gradation control circuit 17. However, the present invention is also applicable to an image forming apparatus of the pulse-width modulation type in which the time period during which light is emitted from the laser diode 12 is controlled by changing the pulse-width of an electric current supplied to the laser diode 12 in compliance with image data.

Furthermore, in the above-described embodiments, the intensity of laser light from the laser diode 12 is controlled in compliance with input levels of image data and the gamma-correction tables are changed in compliance with detection values of the ATDC sensors 8a–8c in the toner density of developers. However, in an apparatus for performing gradation representation in the image density by the use of an area gradation method such as, for example, a dither method, an optimum dither matrix may be selected from among a plurality of threshold patterns (dither matrixes) stored in a ROM in compliance with detection values of the ATDC sensors 8a–8c. In this case, the density of half-tone images can be controlled in compliance with changes in the toner density by controlling an output of the laser diode 12 using the selected dither matrix.

It is to be noted that the present invention is also applicable to a laser printer, a facsimile machine, or the like.

As is clear from the above, according to the present invention, a gradation correction table appropriate for a toner mixture ratio actually detected during an image forming operation is selectively determined. Accordingly, even if the toner mixture ratio changes, gradations of images are properly corrected, thus ensuring stable image formations.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An electrophotographic image forming apparatus comprising:
   a photosensitive member;
   a charging means for charging said photosensitive member with a given initial potential;
   an exposure means for forming an electrostatic latent image by applying light to said photosensitive member charged with said initial potential;
   an exposure control means for controlling an amount of light to be applied to said photosensitive member from said exposure means in compliance with an image density signal indicative of a density of each pixel of an image to be formed;
   at least one developing device accommodating a developer consisting of toner and carrier, said developing device developing said electrostatic latent image formed on said photosensitive member using said developer;
   a toner density detector means for detecting a toner density in said developer;
   a memory means for storing a plurality of gradation correction data; and
   a selector means for selecting one of said plurality of gradation correction data stored in said memory means based upon a toner density detected by said toner density detector means,
   wherein said exposure control means controls the amount of light based upon gradation correction data selected by said selector means.

2. The apparatus according to claim 1, wherein said exposure control means controls an intensity of light to be applied by said exposure means based upon said image density signal.

3. The apparatus according to claim 1, wherein said exposure control means controls a region on said photosensitive member based upon said image density signal, said region being exposed to light in compliance with each pixel of the image to be formed.

4. The apparatus according to claim 1, further comprising a toner replenishing means for replenishing toner into said developing device based upon the toner density detected by said toner density detector means.

5. An electrophotographic image forming apparatus comprising:
   a photosensitive member;
   an exposure means for forming an electrostatic latent image by applying light to said photosensitive member charged with a given potential using a laser beam;
   at least one developing device accommodating a developer consisting of toner and carrier, said developing device developing said electrostatic latent image formed on said photosensitive member using said developer;
   a toner density detector means for detecting a toner density in said developer;
   a memory means for storing a plurality of gradation correction data;
   a selector means for selecting one of said plurality of gradation correction data stored in said memory means based upon a toner density detected by said toner density detector means;
   a correction means for correcting a digital signal indicative of a density of each pixel of an image to be formed based upon gradation correction data selected by said selector means; and
   an exposure control means for converting said digital signal corrected by said correction data to an analog signal and for supplying said analog signal to said exposure means,
   wherein said exposure means applies light to said photosensitive member using a laser beam having an amount of light corresponding to said analog signal.

6. The apparatus according to claim 5, wherein said exposure means applies a laser beam having an intensity corresponding to said analog signal to said photosensitive member.

7. The apparatus according to claim 5, wherein said exposure means changes a time period of exposure of said laser beam in compliance with said analog signal.

8. An electrophotographic image forming apparatus comprising:
   a photosensitive member;

an exposure means for forming an electrostatic latent image by applying light to said photosensitive member charged with a given potential;

at least one developing device accommodating a developer consisting of toner and carrier, said developing device developing said electrostatic latent image formed on said photosensitive member using said developer;

a toner density detector means for detecting a toner density in said developer;

a memory means for storing a plurality of gradation data;

a selector means for selecting one of said plurality of gradation data stored in said memory means based upon a toner density detected by said toner density detector means; and a conversion means for converting a digital signal indicative of a density of each pixel of an image to be formed to an analog signal based upon gradation data selected by said selector means, wherein said exposure means applies light to said photosensitive member at an amount of light corresponding to said analog signal.

9. The apparatus according to claim 8, wherein said gradation data comprise dither matrixes including a plurality of threshold data, and wherein said conversion means compares said digital signal with said threshold data of said dither matrixes and outputs said analog signal corresponding to a comparison result.

10. The apparatus according to claim 8, wherein said conversion means changes an electric current of said analog signal in compliance with said digital signal, and wherein said exposure means applies light having an intensity corresponding to said electric current of said analog signal.

11. An electrophotographic image forming apparatus comprising:

a photosensitive member;

an exposure means for forming an electrostatic latent image by applying light to said photosensitive member charged with a given potential;

at least one developing device accommodating a developer consisting of toner and carrier, said developing device developing said electrostatic latent image formed on said photosensitive member using said developer;

a first detector means for detecting an image density of a toner image developed by said developing device;

a second detector means for detecting a toner density in said developer;

a memory means for storing a plurality of gradation data;

a selector means for selecting one of said plurality of gradation data stored in said memory means based upon a detection result by said first and second detector means; and a conversion means for converting a digital signal indicative of a density of each pixel of an image to be formed to an analog signal based upon gradation data selected by said selector means, wherein said exposure means applies light to said photosensitive member at an amount of light corresponding to said analog signal.

12. An electrophotographic image forming apparatus comprising:

a photosensitive member;

a charger for charging said photosensitive member with a given initial potential;

an exposure means for forming an electrostatic latent image by applying light to said photosensitive member charged with said initial potential;

at least one developing device accommodating a developer consisting of toner and carrier, said developing device developing said electrostatic latent image formed on said photosensitive member using said developer;

a voltage applying means for applying a bias voltage to said developing device;

means for forming a given reference electrostatic latent image on said photosensitive member;

a first detector means for detecting an image density of a reference toner image formed upon development of said reference electrostatic latent image by said developing device;

a second detector means for detecting a toner density in said developer;

a charger control means for controlling an output of said charger in compliance with a detection result by said first detector means;

a bias control means for controlling said bias voltage in compliance with said detection result by said first detector means;

a memory means for storing a plurality of gradation data;

a selector means for selecting one of said plurality of gradation data stored in said memory means based upon a detection result by said first and second detector means; and a conversion means for converting a digital signal indicative of a density of each pixel of an image to be formed to an analog signal based upon gradation data selected by said selector means, wherein said exposure means applies light to said photosensitive member at an amount of light corresponding to said analog signal.

13. In an electrophotographic image forming apparatus having a photosensitive member and at least one developing device accommodating a developer consisting of toner and carrier, said apparatus forming an image in compliance with a digital signal indicative of a density of the image to be formed, an image forming method comprising the steps of:

(a) detecting a toner density in said developer;

(b) determining gradation characteristics of said image forming apparatus in compliance with said detected toner density;

(c) charging said photosensitive member with a given potential;

(d) correcting said digital signal in compliance with said determined gradation characteristics;

(e) converting said corrected digital signal to an analog signal;

(f) forming an electrostatic latent image by applying light to said photosensitive member at an amount of light corresponding to said analog signal; and (g) developing said electrostatic latent image by said developing device.

14. The method according to claim 13, further comprising the steps of:

(h) comparing said detected toner density with a given reference value; and (i) replenishing toner to said developing device based upon a comparison result in said step (h).

15. In an electrophotographic image forming apparatus having a photosensitive member and at least one developing device accommodating a developer consisting of toner and carrier, said apparatus forming an image in compliance with a digital signal indicative of a density of the image to be formed, an image forming method comprising the steps of:
- (a) charging said photosensitive member with a given potential;
- (b) forming a reference electrostatic latent image by applying light to said photosensitive member charged with said given potential at a given reference amount of light;
- (c) forming a reference toner image by developing said reference electrostatic latent image using said developing device;
- (d) detecting an image density of said reference toner image;
- (e) detecting a toner density in said developer;
- (f) determining gradation characteristics of said image forming apparatus in compliance with said detected image density and said detected toner density;
- (g) converting said digital signal to an analog signal;
- (h) forming an electrostatic latent image by applying light to said photosensitive member charged with said given potential at an amount of light corresponding to said analog signal; and
- (i) developing said electrostatic latent image by said developing device.

16. An electrophotographic image forming apparatus which forms multi-tone images in accordance with pixel image data corresponding to a density of each pixel of the images to be formed, comprising:
- a photosensitive member;
- a light source for generating a light beam and for applying said light beam so as to form an electrostatic latent image on said photosensitive member;
- developing means for developing the electrostatic latent image on the photosensitive member with toner;
- memory means or storing a plurality of gradation data for converting said pixel image data to an analog signal indicating an amount of the light beam of said light source;
- toner density detecting means for detecting a toner density of said developing means;
- selecting means for selecting one of said plurality of gradation correction data; and
- driving means for driving said light source based on said analog signal converted by said radiation correction data selected by said selecting means.

17. An electrophotographic image forming apparatus according to claim 16, wherein said driving means modulate an intensity of the light beam from said light source based on said analog signal.

* * * * *